(12) United States Patent
Smith et al.

(10) Patent No.: US 10,146,333 B1
(45) Date of Patent: Dec. 4, 2018

(54) VIRTUAL ENVIRONMENT 3D POINTER MAPPED TO 2D WINDOWED SURFACE

(71) Applicant: Envelop VR, Bellevue, WA (US)

(72) Inventors: Steve Smith, Bellevue, WA (US); Jonathan Mavor, Bellevue, WA (US)

(73) Assignee: MADRONA VENTURE FUND VI, L.P., Seattle, WA (US)

( * ) Notice: Subject to any disclaimer, the term of this patent is extended or adjusted under 35 U.S.C. 154(b) by 33 days.

(21) Appl. No.: 15/161,076

(22) Filed: May 20, 2016

Related U.S. Application Data

(60) Provisional application No. 62/164,529, filed on May 21, 2015.

(51) Int. Cl.
*G06F 3/0346* (2013.01)
*G06T 19/00* (2011.01)

(52) U.S. Cl.
CPC .......... *G06F 3/0346* (2013.01); *G06T 19/006* (2013.01)

(58) Field of Classification Search
None
See application file for complete search history.

(56) References Cited

U.S. PATENT DOCUMENTS

2011/0254845 A1* 10/2011 Oikawa ................... G06T 15/08
345/427
2014/0071116 A1* 3/2014 Johansson ............. G06T 19/006
345/419

* cited by examiner

*Primary Examiner* — Yi Wang
(74) *Attorney, Agent, or Firm* — FSP LLC

(57) ABSTRACT

A virtual display controller is configured to generate a virtual viewing location within a three-dimensional virtual interface within a virtual environment. Computer pointer input is translated to coordinates on a three-dimensional virtual interface, and interactions with objects and virtualized displays within that interface are passed back to the clients populating those objects.

18 Claims, 8 Drawing Sheets

VIRTUAL ENVIRONMENT 3D POINTER MAPPED TO 2D WINDOWED SURFACE

CROSS-REFERENCE TO RELATED APPLICATIONS

This application claims benefit under 35 U.S.C. 119 to U.S. application Ser. No. 62/164,529 filed on May 21, 2015, and incorporated herein by reference in its entirety.

BACKGROUND

Virtual reality allows people to interact with object in a three dimensional virtual space. A problem arises due to the fact that standard means of interacting with a computer were developed to interact with a flat two-axis computer interface in a non-immersive environment. As such, interaction with a virtual interface typically renders the user unable to use standard computer pointing equipment efficiently or in some cases, at all. Users wanting to interact with objects in a virtual environment are often restricted to specialized interface controls. In cases where the user is able to use more standard computer interface controls, the operation of these controls is often not well suited, or able, to transition between operating naturally in a standard two-dimensional computer environment and an immersive three-dimensional virtual environment.

BRIEF SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

In one embodiment, the movement of the computer pointer is mapped to a three-dimensional virtual interface wrapping the user's field of vision. The computer pointer is transformed into a virtual vector, allowing the user to interact with objects at any distance within the virtual environment.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
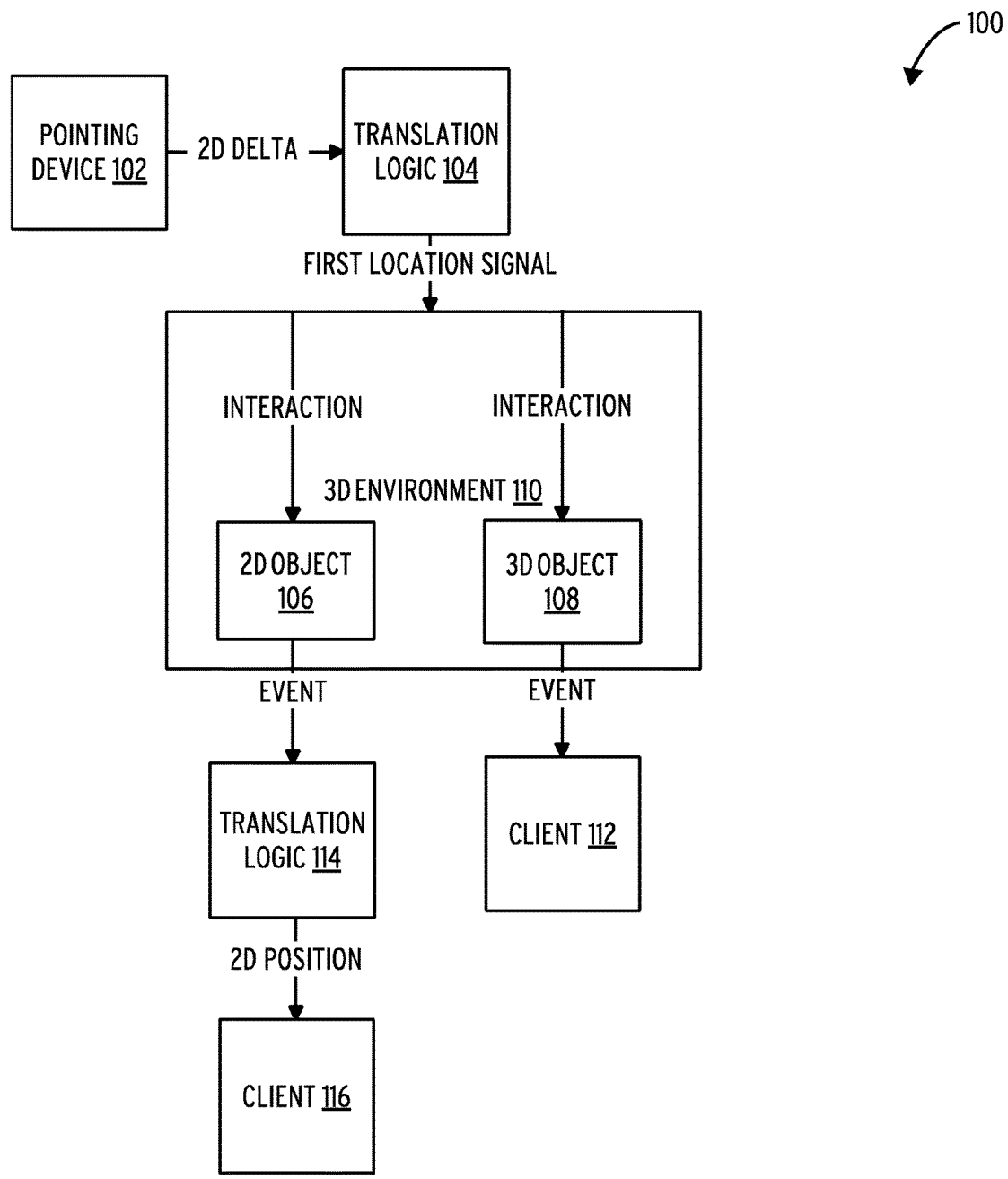
FIG. 1 illustrates an embodiment of a system for mapping a 2D windowed environment to a 3D pointer 100
Figure 2:
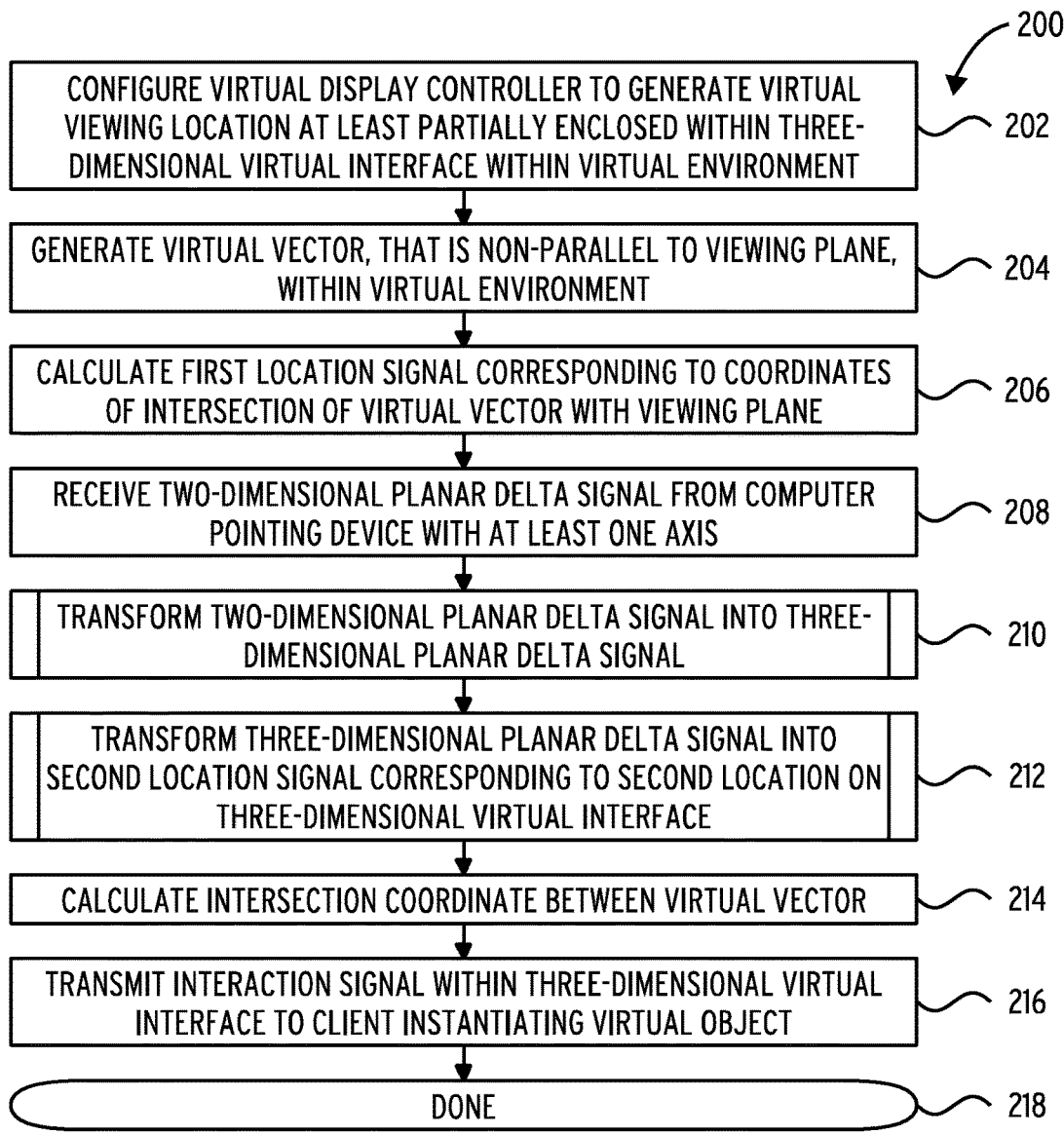
FIG. 2 illustrates process for mapping a 2D windowed environment to a 3D pointer 200 in accordance with one embodiment.
Figure 3:
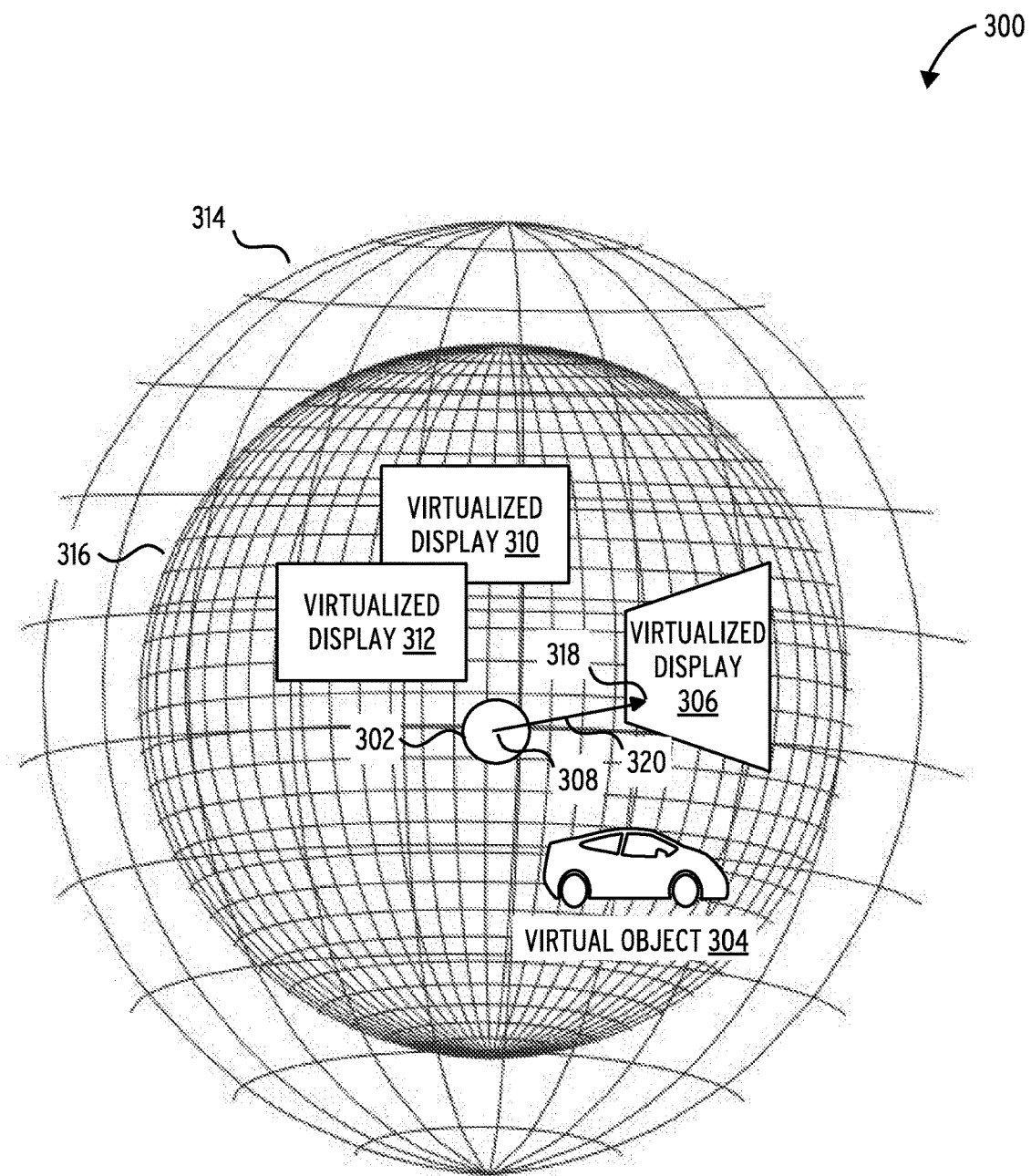
FIG. 3 illustrates an aspect of the system for mapping a 2D windowed environment to a 3D pointer 300 in accordance with one embodiment.
Figure 4:
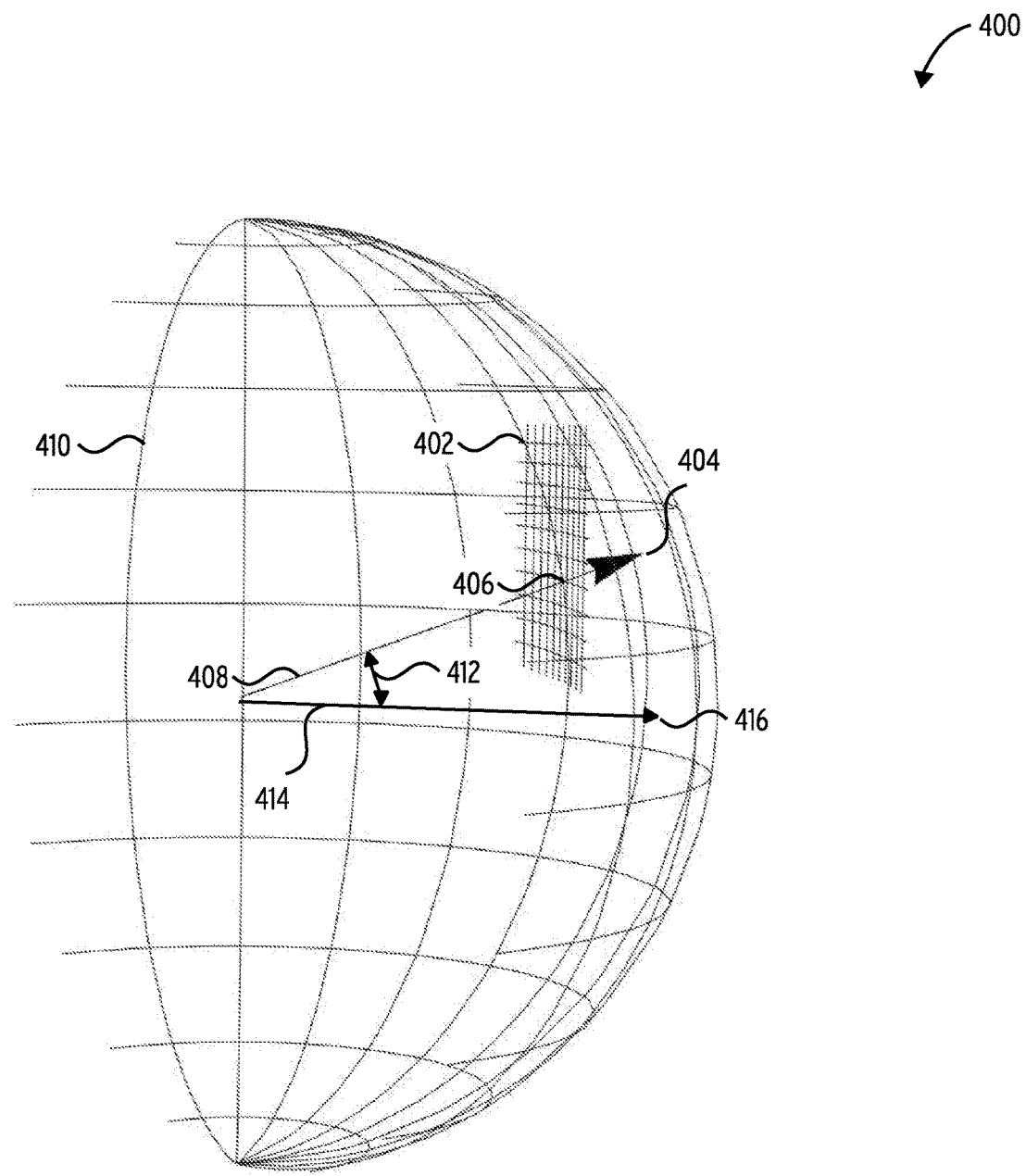
FIG. 4 illustrates an aspect of the system for mapping a 2D windowed environment to a 3D pointer 400 in accordance with one embodiment.
Figure 5:
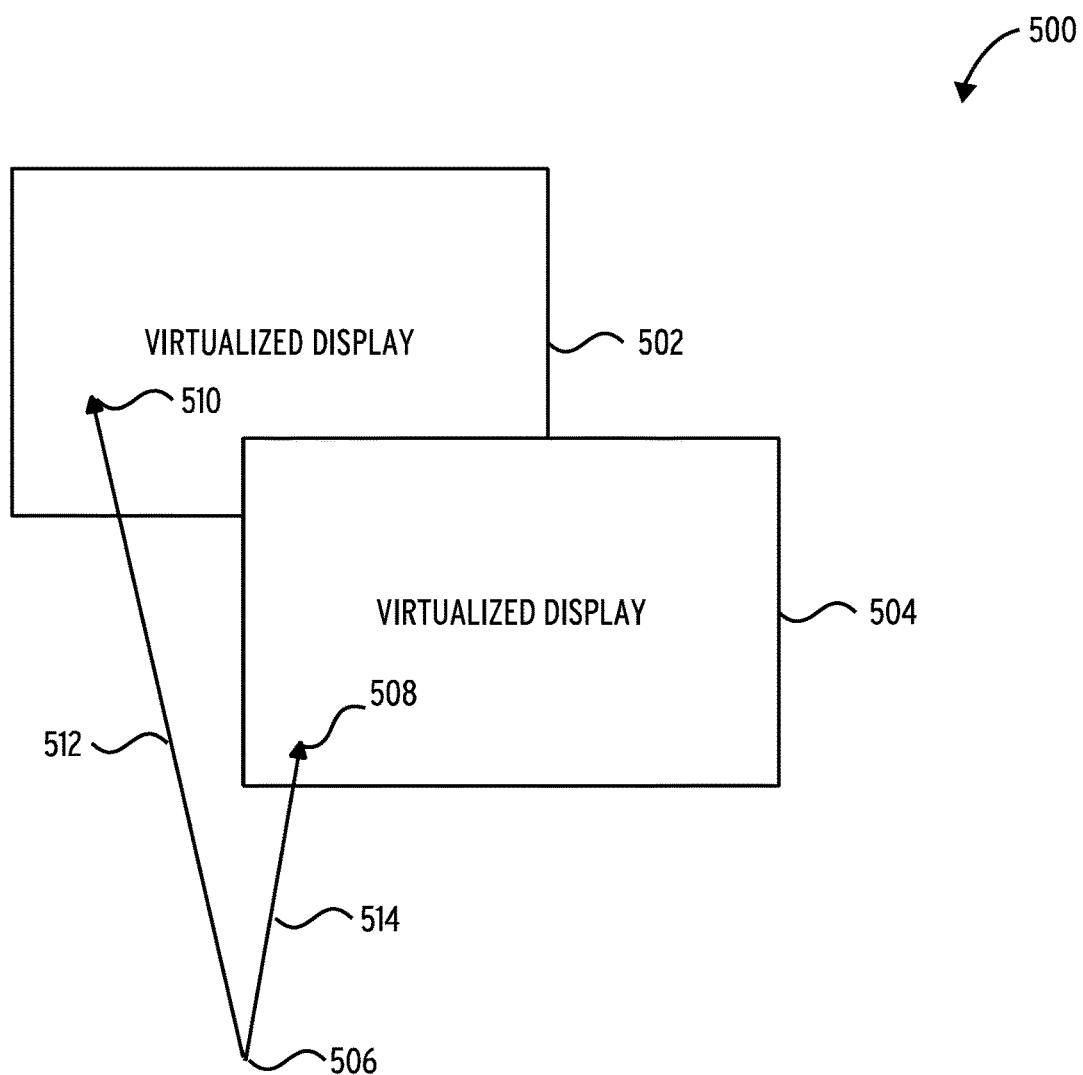
FIG. 5 illustrates an aspect of the system for mapping a 2D windowed environment to a 3D pointer 500 in accordance with one embodiment.
Figure 6:
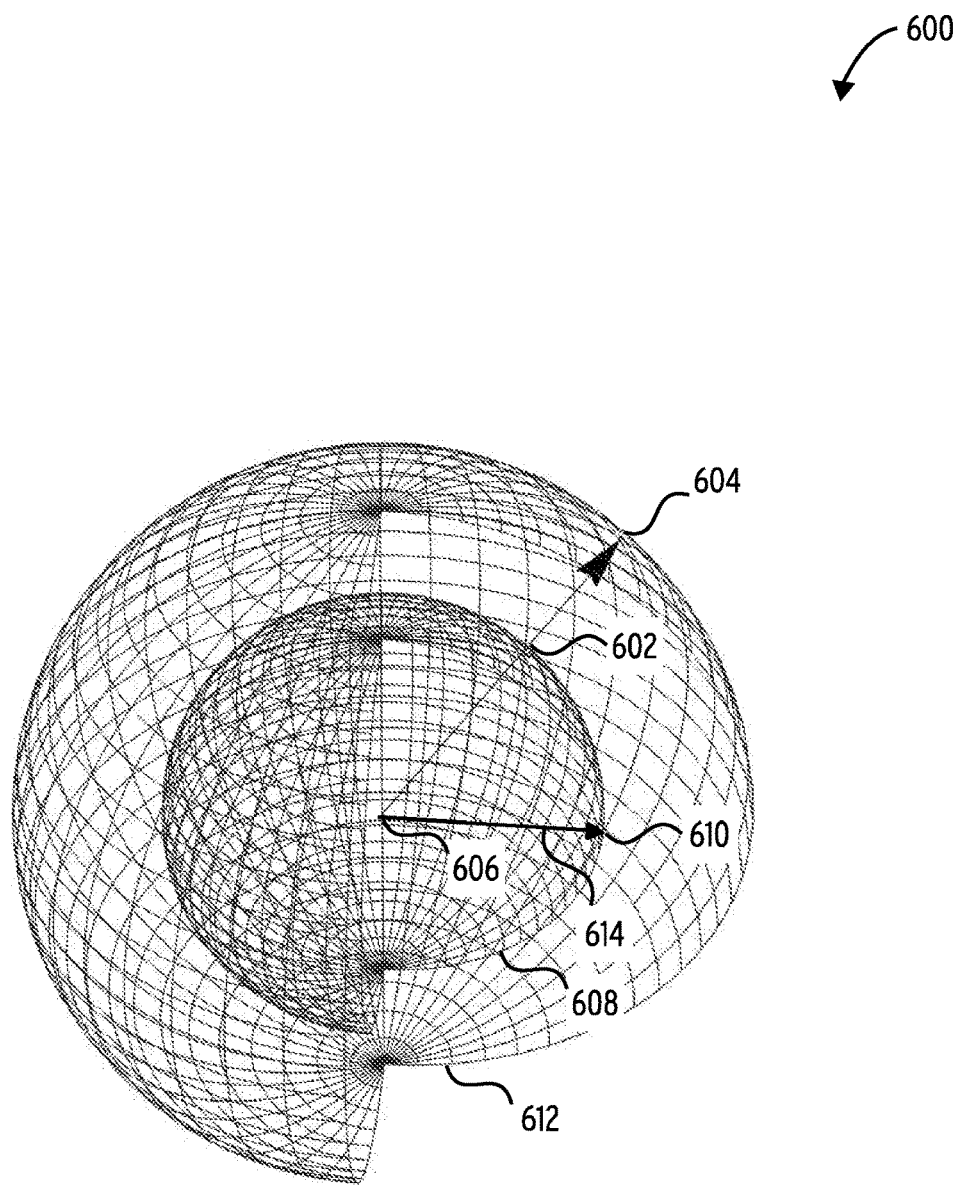
FIG. 6 illustrates an aspect of system for mapping a 2D windowed environment to a 3D pointer 600 in accordance with one embodiment.
Figure 7:
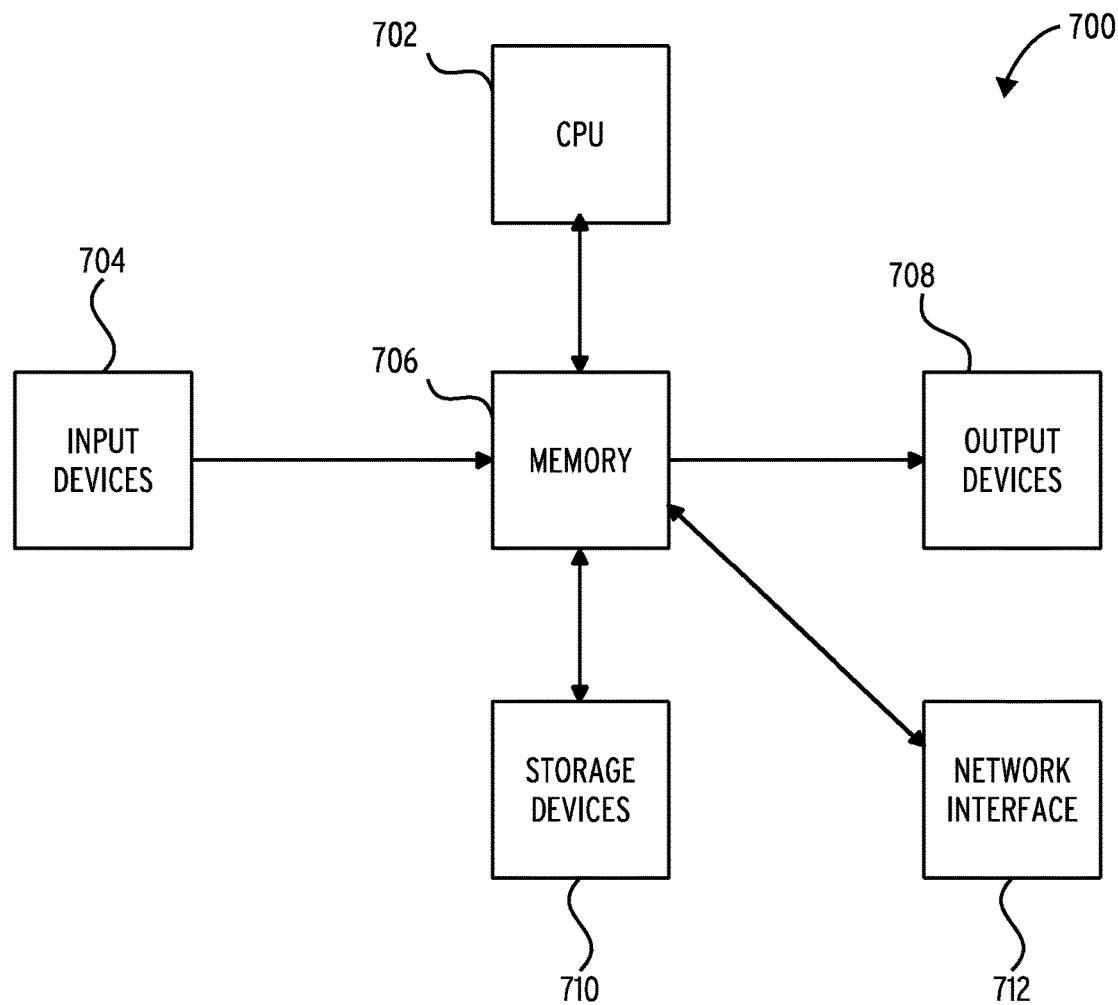
FIG. 7 illustrates a digital apparatus 700 that may implement aspects of the machine processes described herein.

"computer pointing device" in this context refers to a device to translate movements made by a user into movements within a computer system, such as a mouse, joystick, or device utilizing motion capture or acceleration, generally to control the movement of a pointer or visual angle of display on a user interface.

"logic" in this context refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"3D virtual interface" in this context refers to a user-interface, having a curved, flat or polyhedral surface, or subsets of such surfaces, existing in a three dimensional virtual environment.

"viewing plane" in this context refers to a viewable planar area tangent to the surface of the 3D virtual interface at the point of intersection of the virtual vector with the 3d virtual interface, such that when the user looks directly at the intersection point of the virtual vector and the 3d virtual interface the plane would be and approximately orthogonal to the user's line of sight.

"virtual environment" in this context refers to an immersive three-dimensional digital environment or image that can be interacted with in a seemingly physical manner.

"virtual object" in this context refers to an object rendered within virtual reality "virtual viewing location" in this context refers to location within a virtual environment that proves a reference point for the viewing perspective of the user, that is, the "location" of the user within the virtual environment.

"virtualized display" in this context refers to a representation of a computer display or output, depicting an interface device such as a television or computer monitor screen within a virtual environment.

Description

Embodiments of a system and process are disclosed that map a 3D pointer to a 2D windowed surface. In one embodiment a machine system in communication with a computing device and computer pointing device receives input from the computing device about the position and movement of a computer pointer and transforms that input into a signal to control user interaction with a three-dimensional virtual environment. The position or delta signal received from a computer pointing device is transformed into a first location signal indication corresponding to coordinates on a three-dimensional virtual interface which may be concave in relation to the virtual viewing location within the virtual environment and encompass at least part of the user's field of view within the virtual environment. In some embodiments, the virtual interface may be a three-dimensional shape such as an ellipsoid, cylinder or polyhedron which the user is viewing from a perspective within the ellipsoid or polyhedron. In some embodiments, the dimensions of the virtual interface may surround the user completely, or optionally be restricted longitudinally and latitudinally so that it does not cover a full 360 degrees of possible viewing area.

In some embodiments, logic receives a location indication from a virtual interface and transforms the location into an interaction corresponding to coordinates on a virtualized display within the interface. In some embodiments, logic receives a location from a virtual interface and transforms the location into an interaction signal corresponding to coordinates on an object within the interface. A user may interact with objects within the virtual environment through the computer pointing device, in some embodiments this may include virtualized displays such as virtual representations of computer monitor displays. User interactions with objects like these may be translated back to two-dimensional signals and relayed back to the the computing device and display device such as a monitor or television. In one embodiment, the system may compensate for a transition from empty space within a virtual environment to an object within the virtual environment by adapting the scaling of mouse movements or the mouse sensitivity to give a finer degree of control on an object. For example, a user may want to quickly traverse open space within the virtual environment, but then require a finer degree of control within a virtualized display in order to do graphic design work.

In some embodiments the computer pointing device may be any type of computer pointing device such as a standard track pad/track ball, pen/stylus, mouse, joystick, inertial-based gestural control mechanism, video gesture recognition or other method to enable computer interaction.

In some embodiments, a cartesian coordinate system may be converted to a cylindrical or spherical coordinate system to map the pointer movements from the computer pointer within a standard 2D plane to a 3D plane.

In one embodiment, the translation logic 104 and translation logic 114 may utilize a standard conversion of cartesian to spherical coordinates, wherein r is the radius, theta is the inclination and phi is the azimuth.

$$x = r \sin \theta \cos \varphi$$

spherical conversion for x coordinates $$y = r \sin \theta \sin \varphi$$

spherical conversion for y coordinates $$z = r \cos \theta$$

spherical conversion for z coordinates

In another embodiment, the translation logic 104 and translation logic 114 may use cylindrical coordinate systems to calculate the virtual vector, the coordinates rho, phi and z delineate the cylindrical coordinates of a point, wherein rho is the straight line distance from the z axis to the point, phi is the azimuth, that is, the angle between a reference direction on the chosen plane and the line from the origin to the projection of the point on the plane, z is the distance from the chosen plane to the point.

$$x = \rho \cos \varphi$$

cylindrical conversion for x coordinates $$y = \rho \sin \varphi$$

cylindrical conversion for y coordinates

In some embodiments, logic which receives a the signal from a computer pointer or virtual interface transforms that signal into a pointer that is a virtual vector which is non-parallel to the viewing plane, so as to allow the user to interact with objects within a virtual environment regardless of the object's perceived distance from the user within the virtual environment. This vector pointer allows the user to easily select objects regardless of the object's perceived distance from the virtual viewing location. When calculating the virtual vector, a unit vector may also be used to calculate the virtual vector by multiplying the unit vector by a scalar to change the magnitude of the vector to allow for intersection with objects within the virtual environment.

Drawings

In one embodiment, the pointing device 102 sends a two-dimensional delta signal to the translation logic 104 which receives the two-dimensional delta signal and transforms said two-dimensional delta signal into a first location signal. The first location signal is then transmitted to the 3D environment 110. The 3D environment 110 receives the first location signal and transmits an interaction to 2D object 106, such as a graphical representation of a two dimensional display. The 2D object 106 receives the interaction signal and transmits an event signal to the translation logic 114 which translates it into a 2d position signal which is transmitted to the client program. The 3D object 108 receives the interaction signal and transmits an event signal to the client program.

The system for mapping a 2D windowed environment to a 3D pointer 100 may be operated in accordance with process for mapping a 2D windowed environment to a 3D pointer 200.

System for mapping a 2D windowed environment to a 3D pointer 100 comprises pointing device 102, translation logic 104, 3D environment 110, 2D object 106, 3D object 108, translation logic 114, client 112 and client 116.

In block 202, process for mapping a 2D windowed environment to a 3D pointer 200 configures a virtual display controller to generate a virtual viewing location at least partially enclosed within a three-dimensional virtual interface within a virtual environment. In block 204, process for mapping a 2D windowed environment to a 3D pointer 200 generates a virtual vector, that is non-parallel to the viewing plane, within the virtual environment. In block 206, process for mapping a 2D windowed environment to a 3D pointer 200 calculates a first location signal corresponding to coordinates of the intersection of the virtual vector with the viewing plane. In block 208, process for mapping a 2D windowed environment to a 3D pointer 200 receives a two-dimensional planar delta signal from a computer pointing device with at least one axis. In subroutine block 210, process for mapping a 2D windowed environment to a 3D pointer 200 transforms the two-dimensional planar delta signal into a three-dimensional planar delta signal. In subroutine block 212, process for mapping a 2D windowed environment to a 3D pointer 200 transforms the three-dimensional planar delta signal into a second location signal corresponding to a second location on the three-dimensional virtual interface. In block 214, process for mapping a 2D windowed environment to a 3D pointer 200 calculates an intersection coordinate between the virtual vector. In block 216, process for mapping a 2D windowed environment to a 3D pointer 200 transmits an interaction signal within the three-dimensional virtual interface to a client instantiating the virtual object. In done block 218, process for mapping a 2D windowed environment to a 3D pointer 200 ends.

In some embodiments, the process for mapping a 2D windowed environment to a 3D pointer 200 may include configuring a virtual display controller to generate a virtual viewing location at least partially enclosed within a three-dimensional virtual interface within a virtual environment; generating a virtual vector, that is non-parallel to the viewing plane, within the virtual environment; calculating a first location signal corresponding to coordinates of the intersection of the virtual vector with the viewing plane; receiving a two-dimensional planar delta signal from a computer pointing device with at least one axis; calculating an intersection coordinate between the virtual vector and a virtual object within the virtual environment; and/or transmitting an interaction signal within the three-dimensional virtual interface to a client instantiating the virtual object.

In some embodiments, the three-dimensional virtual interface may include a viewing plane.

In some embodiments, receiving a two-dimensional planar delta signal from a computer pointing device with at least one axis may include transforming the two-dimensional planar delta signal into a three-dimensional planar delta signal and/or transforming the three-dimensional planar delta signal into a second location signal corresponding to a second location on the three-dimensional virtual interface.

In various embodiments, the initial point of the virtual vector may be located in the center of the virtual environment, or adjacent to and behind the virtual viewing location. The terminal point of the virtual vector may be located on the surface of the virtual environment. A magnitude of the virtual vector may be infinite, and/or the three-dimensional virtual interface may be a three dimensional shape such as an ellipsoid. The three-dimensional virtual interface may be a three dimensional shape such as a polyhedron, and/or dimensions of the three-dimensional virtual interface may be restricted longitudinally and latitudinally.

In some embodiments, the virtual object is a virtualized display and the intersection coordinate is transformed into an interaction signal corresponding to coordinates on the virtualized display within the three-dimensional virtual interface.

The process for mapping a 2D windowed environment to a 3D pointer 200 improves the efficiency of a computer by allowing the use of a single pointing device to be used to interact with multiple virtualized displays and objects within a virtual environment. This allows a user who is using a virtual display to control it from within the virtual environment through the use of a normal computer pointer, which can seamlessly interact with virtual objects as well as objects within the virtualized displays, removing the need for the user to use different devices depending on whether the interaction occurs within a normal monitor output or within the virtual environment. Further, In one embodiment, the origin 308 of the virtual vector 320 is positioned behind user perspective first location signal 302. In one embodiment, three-dimensional virtual interface 316 is positioned within virtual environment 314 and virtualized display 306, virtualized display 310, virtualized display 312, are rendered within the virtual environment 314 and virtualized display 306, virtualized display 312 and virtualized display 310 are positioned on the three-dimensional virtual interface 316. In one embodiment, the location of the computer pointer 318 with an object within the virtual environment 314 such as virtualized display 306 may be determined by calculating the intersection of virtual vector 320 with virtualized display 306.

In one embodiment, delta 412 is received from a computer pointer input and translated into a movement of the intersection of initial virtual vector 414 to resultant virtual vector 408. This may translate three dimensional coordinate 416 into three-dimensional coordinate 404. In some configurations, a virtualized display 402 is displayed on the three-dimensional virtual interface 410. The intersection of virtual vector 408 with three-dimensional virtual interface 410 transforms the three-dimensional coordinate 404 into two-dimensional coordinate 406 on virtualized display 402 mapping the intersection location onto the computer desktop as a computer pointer location.

Virtualized display 504 is positioned in front of virtualized display 502 the intersection 508 of virtual vector 514 with virtualized display 504 and plots the location of the computer pointer according to the location of the intersection 508.

The origin 506 may remain the same for both virtual vector 512 and virtual vector 514. In still further embodiments, the origin 506 of virtual vector 512 and virtual vector 514 may change depending on the movement of the vector so that the vector direction remains constant.

In one embodiment, the origin 606 of virtual vector 602 and virtual vector 614 occurs at the center of three-dimensional virtual interface 608 and virtual environment 612. In one embodiment, virtual vector 614 and virtual vector 602 may be rays, extending effectively infinitely beyond intersection 610 and intersection 604 respectively. The intersection 604 and intersection 610 may be used to plot the location of a computer pointer within the 612.

Input devices 704 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 704 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 704 are provided via various machine signal conductors (e.g., busses or network interfaces) and circuits to memory 706.

The memory 706 is typically what is known as a first or second level memory device, providing for storage (via configuration of matter or states of matter) of signals received from the input devices 704, instructions and information for controlling operation of the CPU 702, and signals from storage devices 710.

Information stored in the memory 706 is typically directly accessible to the CPU 702 of the device. Signals input to the device cause the reconfiguration of the internal material/energy state of the memory 706, creating in essence a new machine configuration, influencing the behavior of the digital apparatus 700 by affecting the behavior of the CPU 702 with control signals (instructions) and data provided in conjunction with the control signals.

Second or third level storage devices 710 may provide a slower but higher capacity machine memory capability. Examples of storage devices 710 are hard disks, optical disks, large capacity flash memories or other non-volatile memory technologies, and magnetic memories.

The CPU 702 may cause the configuration of the memory 706 to be altered by signals in storage devices 710. In other words, the CPU 702 may cause data and instructions to be read from storage devices 710 in the memory 706 from which may then influence the operations of CPU 702 as instructions and data signals, and from which it may also be provided to the output devices 708. The CPU 702 may alter the content of the memory 706 by signaling to a machine interface of memory 706 to alter the internal configuration, and then converted signals to the storage devices 710 to alter its material internal configuration. In other words, data and instructions may be backed up from memory 706, which is often volatile, to storage devices 710, which are often non-volatile.

Output devices 708 are transducers which convert signals received from the memory 706 into physical phenomenon such as vibrations in the air, or patterns of light on a machine display, or vibrations (i.e., haptic devices) or patterns of ink or other materials (i.e., printers and 3-D printers).

The network interface 712 receives signals from the memory 706 and converts them into electrical, optical, or wireless signals to other machines, typically via a machine network. The network interface 712 also receives signals from the machine network and converts them into electrical, optical, or wireless signals to the memory 706.

Figure 8:
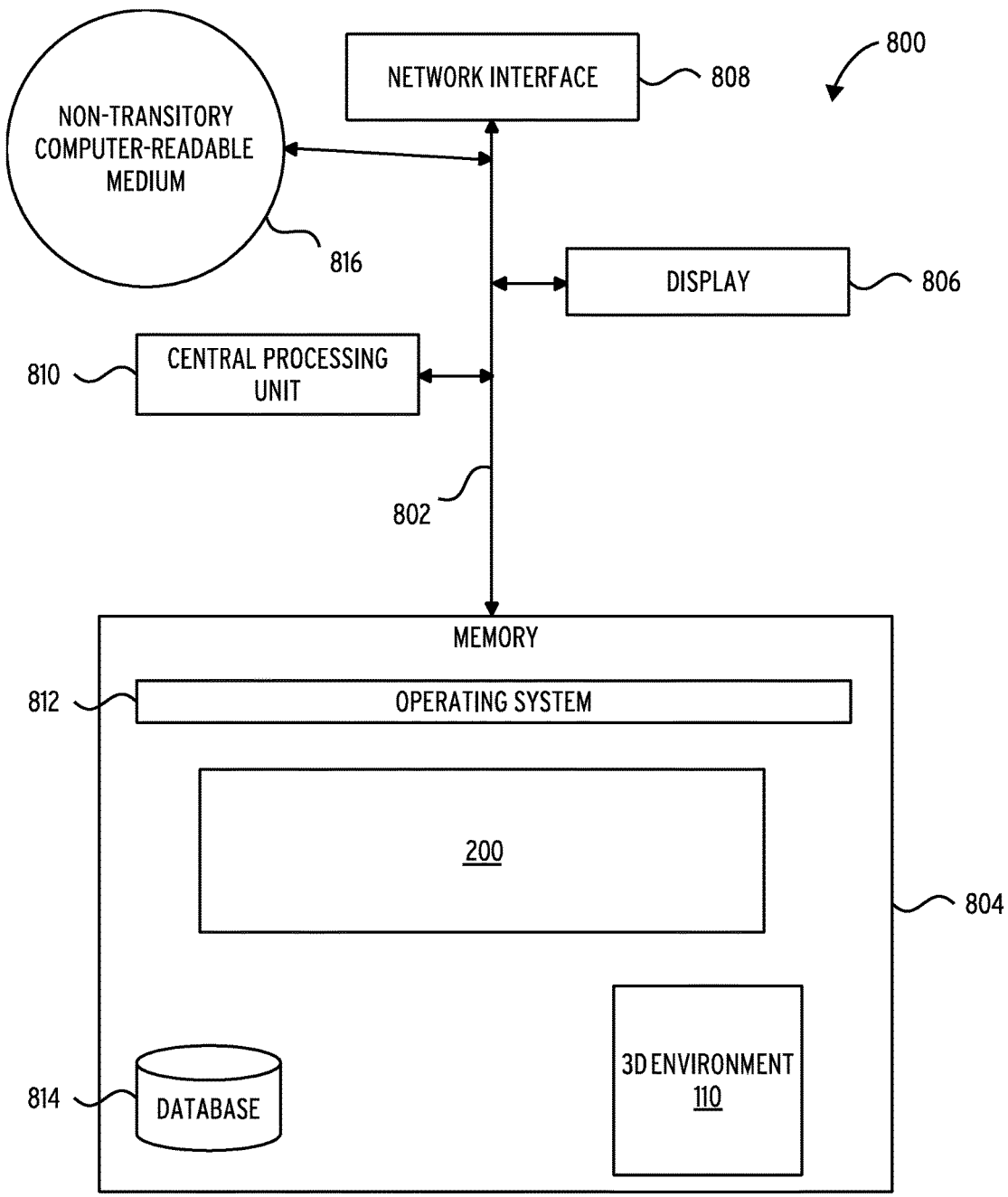
FIG. 8 illustrates a system 800 in accordance with one embodiment.

FIG. 8 illustrates several components of an exemplary system 800 in accordance with one embodiment. In various embodiments, system 800 may include a desktop PC, server, workstation, mobile phone, laptop, tablet, set-top box, appliance, or other computing device that is capable of performing operations such as those described herein. In some embodiments, system 800 may include many more components than those shown in FIG. 8. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 800 may comprise one or more physical and/or logical devices that collectively provide the functionalities described herein. In some embodiments, system 800 may comprise one or more replicated and/or distributed physical or logical devices.

In some embodiments, system 800 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 800 includes a bus 802 interconnecting several components including a network interface 808, a display 806, a central processing unit 810, and a memory 804.

Memory 804 generally comprises a random access memory ("RAM") and permanent non-transitory mass storage device, such as a hard disk drive or solid-state drive. Memory 804 stores an operating system 812.

These and other software components may be loaded into memory 804 of system 800 using a drive mechanism (not shown) associated with a non-transitory computer-readable medium 816, such as a floppy disc, tape, DVD/CD-ROM drive, memory card, or the like.

Memory 804 also includes database 814. In some embodiments, system 800 may communicate with database 814 via network interface 808, a storage area network ("SAN"), a high-speed serial bus, and/or via the other suitable communication technology.

In some embodiments, database 814 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory. In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment). Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A method comprising:
   configuring a virtual display controller to generate a virtual viewing location optically coincident to a three-dimensional virtual interface within a virtual environment, the three-dimensional virtual interface comprising a viewing plane;
   generating a virtual vector within the virtual environment, the virtual vector being non-parallel to the viewing plane at the virtual vector's point of intersection with the viewing plane;
   calculating a first location signal corresponding to coordinates of the intersection of the virtual vector with the viewing plane;
   receiving a two-dimensional planar delta signal from a computer pointing device with at least one axis, the two-dimensional planar delta signal comprising cartesian coordinates, the cartesian coordinates comprising an x-coordinate and a y-coordinate registered by the computer pointing device;
   transforming the two-dimensional planar delta signal into a three-dimensional planar delta signal, the three-dimensional planar delta signal comprising a spherical coordinate transformation or cylindrical coordinate transformation of the two-dimensional planar delta signal from the computer pointing device;
   transforming said three-dimensional planar delta signal and the first location signal into a second location signal corresponding to a second location on said three-dimensional virtual interface;
   calculating an intersection coordinate between the virtual vector and a virtual object within the virtual environment based on the second location signal;
   transforming the intersection coordinate into an interaction signal; and
   transmitting the interaction signal within said three-dimensional virtual interface to a client instantiating the virtual object.

2. The method of claim 1 wherein the virtual vector comprises an origin located in the center of the virtual environment.

3. The method of claim 1 wherein the virtual vector comprises an origin adjacent to and behind the virtual viewing location.

4. The method of claim 1 wherein the virtual vector comprises a terminal point located on the surface of the virtual environment.

5. The method of claim 1 wherein a magnitude of the virtual vector is infinite.

6. The method of claim 1 wherein the three-dimensional virtual interface is an ellipsoid.

7. The method of claim 1 wherein said three-dimensional virtual interface is a polyhedron.

8. The method of claim 1 wherein dimensions of said three-dimensional virtual interface is restricted longitudinally and latitudinally.

9. The method of claim 1 wherein the virtual object is a virtualized display and the intersection coordinate is transformed into an interaction signal corresponding to coordinates on the virtualized display within the virtual environment.

10. A computing apparatus, the computing apparatus comprising:
    a processor; and a memory storing instructions that, when executed by the processor, configure the apparatus to:
configure a virtual display controller to generate a virtual viewing location at least partially enclosed within a three-dimensional virtual interface within a virtual environment, the three-dimensional virtual interface comprising a viewing plane;
generate a virtual vector, that is non-parallel to the viewing plane, within the virtual environment;
calculate a first location signal corresponding to coordinates of the intersection of the virtual vector with the viewing plane;
receive a two-dimensional planar delta signal from a computer pointing device with at least one axis, the two-dimensional planar delta signal comprising cartesian coordinates, the cartesian coordinates comprising an x-coordinate and a y-coordinate registered by the computer pointing device;
transform the two-dimensional planar delta signal into a three-dimensional planar delta signal, the three-dimensional planar delta signal comprising a spherical coordinate transformation or cylindrical coordinate transformation of the two-dimensional planar delta signal from the computer pointing device;
transform said three-dimensional planar delta signal and the first location signal into a second location signal corresponding to a second location on said three-dimensional virtual interface;
calculate an intersection coordinate between the virtual vector and a virtual object within the virtual environment based on the second location signal;
transform the intersection coordinate into an interaction signal; and
transmit the interaction signal within said three-dimensional virtual interface to a client instantiating the virtual object.

11. The computing apparatus of claim 10 wherein the virtual vector comprises an initial point located in the center of the virtual environment.

12. The computing apparatus of claim 10 wherein the virtual vector comprises an initial point adjacent to and behind the virtual viewing location.

13. The computing apparatus of claim 10 wherein the virtual vector comprises a terminal point located on the surface of the virtual environment.

14. The computing apparatus of claim 10 wherein a magnitude of the virtual vector is infinite.

15. The computing apparatus of claim 10 wherein the three-dimensional virtual interface is an ellipsoid.

16. The computing apparatus of claim 10 wherein said three-dimensional virtual interface is a polyhedron.

17. The computing apparatus of claim 10 wherein dimensions of said three-dimensional virtual interface is restricted longitudinally and latitudinally.

18. The computing apparatus of claim 10 wherein the virtual object is a virtualized display and the intersection coordinate is transformed into an interaction signal corresponding to coordinates on the virtualized display within the virtual environment.

* * * * *